United States Patent
Mühlig et al.

(10) Patent No.: US 10,279,474 B2
(45) Date of Patent: May 7, 2019

(54) METHOD FOR IMPROVING OPERATION OF A ROBOT

(71) Applicant: HONDA RESEARCH INSTITUTE EUROPE GMBH, Offenbach/Main (DE)

(72) Inventors: Manuel Mühlig, Offenbach/Main (DE); Michael Gienger, Offenbach/Main (DE); Akinobu Hayashi, Offenbach/Main (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 158 days.

(21) Appl. No.: 15/084,705

(22) Filed: Mar. 30, 2016

(65) Prior Publication Data
US 2016/0288323 A1  Oct. 6, 2016

(30) Foreign Application Priority Data

Apr. 2, 2015  (EP) .................................. 15162447

(51) Int. Cl.
*B25J 9/16*  (2006.01)

(52) U.S. Cl.
CPC ............. *B25J 9/163* (2013.01); *B25J 9/1656* (2013.01); *G05B 2219/40499* (2013.01)

(58) Field of Classification Search
CPC . B25J 9/163; B25J 9/1656; B25J 9/003; B25J 9/1697; Y10S 901/01; Y10S 901/02; Y10S 901/03; Y10S 901/47; G05B 2219/40499; A61K 2300/00; A61K 31/05; A61K 31/198; A61K 31/26; A61K 31/7048; A61K 45/06; A61P 11/00; A61P 29/00; C07C 331/20

USPC .......................................................... 706/12
See application file for complete search history.

(56) References Cited

U.S. PATENT DOCUMENTS

| | | | |
|---|---|---|---|
| 5,367,449 A | 11/1994 | Manthey | |
| 5,608,843 A * | 3/1997 | Baird, III | ........... G05B 13/0265 706/23 |
| 8,265,789 B2 | 9/2012 | Lee et al. | |
| 8,909,590 B2 * | 12/2014 | Newnham | ............ G06N 99/005 706/52 |
| 9,555,545 B2 * | 1/2017 | Linnell | ................. B25J 9/1656 |

(Continued)

OTHER PUBLICATIONS

European Search Report dated Dec. 4, 2015 corresponding to European Patent Application No. 15162447.5.

(Continued)

*Primary Examiner* — Tan T. Nguyen
(74) *Attorney, Agent, or Firm* — Squire Patton Boggs (US) LLP (57) ABSTRACT

The invention relates to a method for improving operation of at least one robot. The robot is being operated on the basis of a set of predefined actions. A method comprises generating combined actions by combining at least two actions out of a set of original actions stored in an action library. Storing the combined actions in the actions library in addition to the original actions. Applying a reinforcement learning algorithm to the set of actions stored now in the action library to learn a control policy making use of the original actions and the combined actions. And finally, operating the robot on the basis of the resulting action library.

7 Claims, 4 Drawing Sheets

(56) References Cited

U.S. PATENT DOCUMENTS

| | | | |
|---|---|---|---|
| 9,789,605 B2* | 10/2017 | Meier | B25J 9/163 |
| 2013/0318023 A1* | 11/2013 | Morimura | G06N 99/005 |
| | | | 706/46 |
| 2015/0217449 A1* | 8/2015 | Meier | B25J 9/1602 |
| | | | 700/257 |
| 2015/0290795 A1* | 10/2015 | Oleynik | G05B 19/42 |
| | | | 700/257 |
| 2016/0259717 A1* | 9/2016 | Nychis | G06F 3/04842 |

OTHER PUBLICATIONS

Chen K. Tham et al.: "A Modular Q-Learning Architecture for Manipulator Task Decomposition," Proceedings of the Eleventh International Conference on Machine Learning, Jan. 1, 1994, XP055229377, pp. 309-317.

Khashayar Rohanimanesh et al.: "Coarticulation: An Approach for Generating Concurrent Plans in Markov Decision Processes," Proceedings/Twenty-second International Conference on Machine Learning, Bonn, Germany, Aug. 1-11, 2005, Aug. 7, 2005, XP055230032, pp. 720-727.

A. Gil, H. Stern, Y. Edan and U. Kartoun, "A Scheduling Reinforcement Learning Algorithm", Proceedings of 2008 ISFA, International Symposium on Flexible Automation, Atlanta, GA, USA, Jun. 23-26, 2008, 6 pages.

F. Zacharias, D. Leidner, F. Schmidt, C. Borst and G. Hirzinger, "Exploiting Structure in Two-armed Manipulation Tasks for Humanoid Robots", IEEE/RSJ International Conference on Intelligent Robots and Systems (IROS), Taipei, Taiwan, Oct. 18-22, 2010, pp. 5446-5452.

T. Luksch, M. Gienger, M. Muhlig and T. Yoshiike, "Adaptive Movement Sequences and Predictive Decisions based on Hierarchical Dynamical Systems", IEEE/RSJ International Conference on Intelligent Robots and Systems (IROS), Vilamoura, Algarve, Portugal, Oct. 7-12, 2012, pp. 2082-2088.

B. Siciliano and O. Khatib, "Springer Handbook of Robotics", Springer-Verlag, Berlin Heidelberg, May 2008, 1627 pages.

* cited by examiner

METHOD FOR IMPROVING OPERATION OF A ROBOT

BACKGROUND

Field

The invention relates to a method for improving operation of at least one robot which is operated on the basis of a set of predefined actions.

Description of the Related Art

Over the last years, robots have been improved so that the tasks that can be delegated to a robot are not limited to a simple task like picking and placing items from a predetermined position to a predetermined target position. The robots now often use situation recognition on the basis of which it is decided which action is to be taken next. But still the overall behavior of the robot typically is composed of distinct actions. As an example, motions can be structured as smaller motion chunks, sometimes represented as so-called motion primitives. It is to be noted that in the context of the present invention and also the discussion of prior art, the term "action" is not limited to motion. The term "action" rather defines any actuation of a robots component, such as for example the robots joints, manipulators or sensors for certain amount of time or until a certain event.

Figure 5:
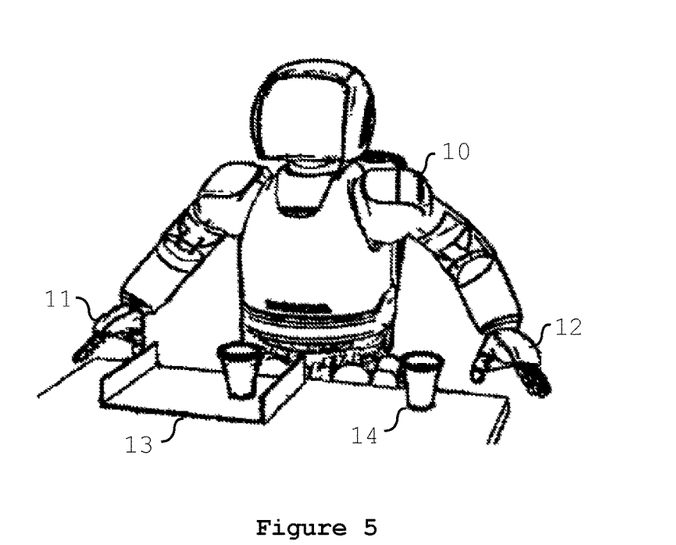
FIG. 5 is a service robot scenario for showing a possible application.
Figure 6:
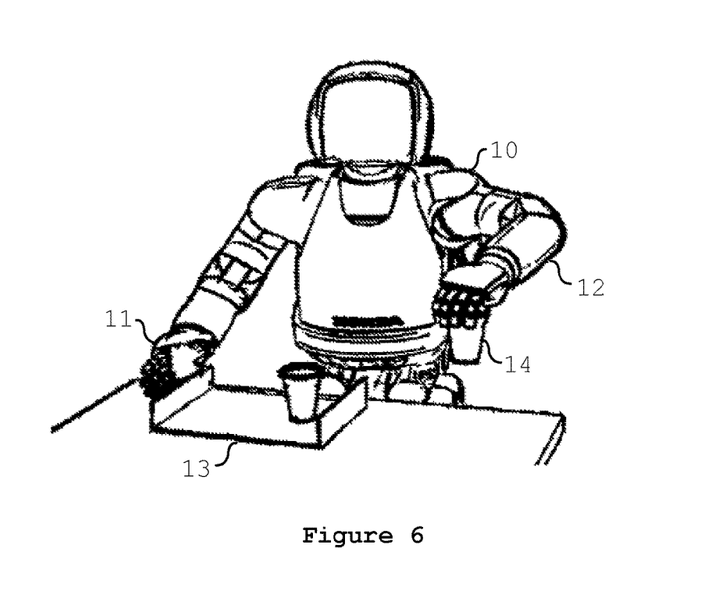
FIG. 6 is a situation of FIG. 5 where the combined actions are already applied.

The actions that are used by a robot in order to perform a particular task or a desired behavior usually are created by a human designer or learned individually. Such single actions are then executed on the robot in a sequence or as a reaction to the perceived state. Although, the task that is delegated to the robot may be achieved by such a sequence of actions it is often desirable to let the robot perform multiple actions in parallel to achieve different goals at the same time. One example may be that individual motion primitives may affect separate end-effectors of a robot, for example the arms of a humanoid robot. It is evident that by performing multiple actions in parallel, the efficiency could be improved by reducing the time needed to achieve the combined goal. FIGS. 5 and 6 show such a situation. The scenario shows a humanoid service robot 10 and the task is to clean up a table by picking up an empty cup 14 and placing it onto a tray 13 for bringing them away later. Since the position of the tray 13 may vary, it might be necessary to push the tray 13 aside, e.g. to the center of the working range of the robot 10, so that placing the cup 14 on the tray 13 becomes possible without violating joint limits. A well-known strategy would now be to conduct different actions sequentially, which means that first the tray 13 is pushed by the first end-effector 11 towards the center of the working range of the robot 10 and thereafter the cup 14 is picked and placed by the other end-effector 12 of the robot. This can be performed now because the tray 13 is positioned in an area where the robot 10 can place the cup 14.

As it is now shown in FIG. 6, it would be desirable to execute a combined action of pushing the tray 13 to the center and picking the cup 14 with the other hand (end-effector).

In order to increase the efficiency of a working robot, it was described by A. Gil, H. Stern, Y. Edan and U. Kartoun in "A Scheduling Reinforcement Learning Algorithm" (International Symposium on Flexible Automation, Atlanta, Ga., 2008) that using reinforcement learning on the basis of Q-learning is used to calculate rewards that lead to a preference of faster task completion. Thus, the control policy which is the outcome of such reinforcement learning process, has an improved efficiency with respect to an overall time for completing a task. But nevertheless, it makes only use of sequentially executed actions.

On the other side, it is described in U.S. Pat. No. 8,265,789 B2 how two actions can be executed at the same time. But the reference is silent with respect to the generation of such a combined action because it is limited to the question of how two actions are executed at the same time, e.g. blending of motion commands. Thus, if the combined action is to be executed the reference gives the teaching of how this can be implemented in the robot. Last but not least, it is described by F. Zacharias, D. Leidner, F. Schmidt, C. Borst and G. Hirzinger in "Exploiting Structure in Two-armed Manipulation Tasks for Humanoid Robots" (IEEE/RSJ International Conference on Intelligent Robots and Systems (IROS), Taipei, 2010) that a two-arm-robot can parallelize two actions based on the required workspace. In order to make the two actions being executed in parallel, it is determined if the workspace for these two actions is disjunct. In that case the tasks are independent and two individual motion planners are then used to generate the appropriate motions individually and the actions are finally executed in parallel. This approach only takes into consideration geometric aspects of the two actions. It furthermore does not assess the question if a combination of two actions is feasible at all.

It is thus the object of the present invention to provide a method that improves the operation of at least one robot which is operated on the basis of predefined actions.

SUMMARY

The problem is solved with the method according to the independent claim. Advantageous aspects are described in the sub claims.

According to the inventive method, at first "combined actions" are generated by combining at least two actions out of a set of original actions that are stored in an action library. The original actions may be for example motion primitives or other actions that are usually used to be executed sequentially in order to achieve a goal. A combined action is an action that consists of at least two actions which are to be executed in parallel. In parallel, in this regard means that either the two actions start at the same time, start with a predetermined delay or end at the same time.

When such combined actions have been generated, the combined actions are stored in the action library in addition to the original actions which are already stored there. Thus, a new or extended action library results which is the basis for applying a reinforcement learning algorithm. The reinforcement learning algorithm is applied to the set of actions which is now stored in the action library in order to learn a control policy that makes use of the original actions as well as the combined actions. Thus, it is then possible to control the robot on the basis of a new control policy and in particular on the basis of the extended, new action library that includes not only the original actions that could be performed in sequence, but also the combined actions which can improve the efficiency when a robot is operated.

It is in particular advantageous when applying the reinforcement learning algorithm to the extended set of actions of the extended action library that not only an automatic generation of the combined actions is performed, but that a new control policy can be achieved making use of all options that are now available.

In order to avoid unnecessary calculation efforts, combined actions may be determined not to be used and then after the reinforcement learning step they are removed from the library. Thus, during further operation, these combinations are no longer present and thus a library can be kept small.

There is a plurality of advantageous ways to generate the combined actions. First, it is an advantage to simply combine two (or more) original actions of the initial action library that shall be performed in parallel and thus form a combined action together. Such combination of two (or more) original actions may be performed for any pair (or sub set) of original actions that can be thought of. This will lead to a maximum number of combined actions that are mathematically possible. Of course, such combined action can include actions that are not reasonable or cannot be performed at all. It is thus furthermore an advantage if the impossible combined actions are determined and omitted when the combined actions are stored additionally in the library. This has the advantage that for further processing only a reduced number of combined actions is taken into consideration. Thus, in the following learning step the calculation effort is reduced.

Another is approach to generate the combined actions is using an already known control policy that is the result of a reinforcement learning step that was previously applied to the set of original actions of the action library. In many cases there exists knowledge about the control policy being the result of such reinforced learning steps. Then, it is also possible to determine which two actions appear sequentially in the control policy. As it is most likely that a parallel execution of these two or more actions, that are executed in sequence anyway according to the original control policy, is advantageous the combined actions that are generated are a combination of exactly two actions appearing sequentially in the known control policy.

Furthermore, advantageously knowledge about a control policy that is generated on the basis of the original actions is used to improve policy learning for the new set of actions which includes the original actions as well as the combined actions. Thus, the old control policy gives the starting point for the reinforcement learning algorithm which again increases the efficiency of the calculation.

When the reinforcement learning algorithm is applied it is furthermore preferred that the reward functions that are used in the reinforcement learning algorithm favor combined actions and/or faster task achievement. By doing so, it is ensured that the combined actions are considered and that the resulting control policy has an improved efficiency with respect to the original actions that are used in the original control policy.

The method can be used generally in a real robot, but it is particularly preferred that a simulation is performed which includes at least the steps of generating the combined actions, storing the combined actions and applying the reinforcement learning algorithm. It is evident that the actions and combined actions that are initially and/or finally used in the action library of the simulation may as well be stored in an action library actually located in the robot. After the method is performed, the combined actions that are added to the action library in the simulation are then of course also added to the real action library of the real robot and then on the basis of this action library, the operation of the robot is performed.

According to another advantageous aspect, the steps of the method may be performed in a plurality of successive iterations. By doing so, it is possible to generate even more complex actions, because combined actions may be combined with simple actions in the second iteration step or even with other combined actions. The action library with all actions stored there (original actions of the first iteration and combined actions of the first iteration) in the next iteration for original actions and may be combined by the same procedure as described above.

BRIEF DESCRIPTION OF THE DRAWINGS

The method including further aspects and advantageous will now be described in detail with reference to the annexed drawings. In the drawings, there is shown

DETAILED DESCRIPTION

Before an explanation of the invention is started, it has to be emphasized that the invention is not limited to a particular type of robot or a particular type of actions. This is because although there is a large variety of different robot types, they all have in common that they act in their environment. Thus, the actions that are performed or executed by the robots may be of different types as well because they depend on the intended interaction with their environment. Examples for actions, that can be assumed to be discrete building blocks, are:

Motions: Here the robots actuators are used to manipulate the environment or alternatively to move the robot.

Sensing: Devices that are capable of physically sensing the environment of the robot, like for example cameras, laser range finders, tactile sensors or similar sensors are attached to the robot or particular parts thereof and can provide information about the environment of the robot.

Audio/speech: Listening functions or speaking functions are intended to enable the robot to communicate with entities in the environment of the robot. This is in particular advantageous if the robot shall be guided or instructed by spoken commands. The other way round, it is possible that the robots comments on detected things, perceived objects and the like.

Visualization: Additional information may be provided by use of a computer display which is either attached to the robot directly or at least controlled by the robot so that the displayed output on the computer display eventually is an action executed by the robot.

Figure 1:
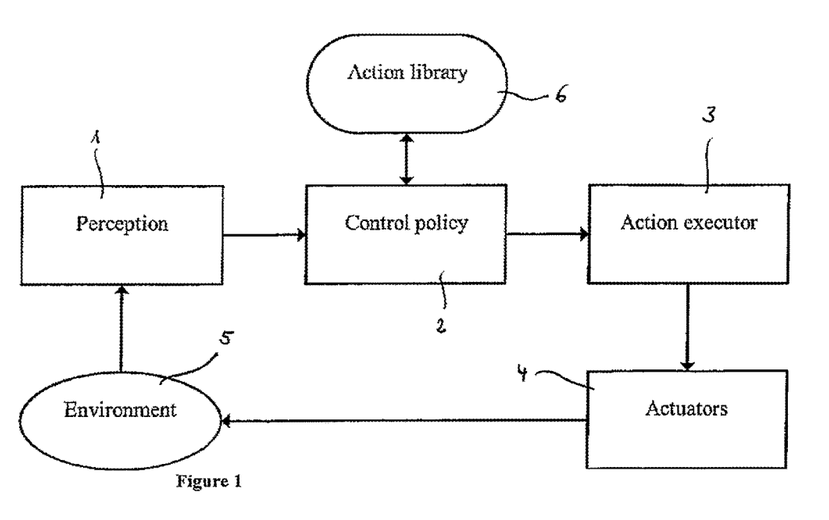
FIG. 1 is a schematic for explaining how robots execute an action using state-action mapping.

It is to be noted that the above-given list of examples for actions is of course not exhausted. In this regard, it is expressively referred to B. Siciliano and K. Oussama, Springer Handbook of Robotics, Springer Berlin Heidelberg, 2008 which gives an overview on what an action can be for different types of robots. As mentioned already above, the invention is intended to be suitable for any type of action for any type of robot. For the understanding of the invention itself it is important to at first understand in which way an action that a robot should execute is selected. A plurality of actions is selectable which previously have been defined by a human designer. A particular action which is then to be executed by the robot is selected on the basis of a control policy that maps a perceived state to a specific action. Such a flow is shown in FIG. 1. At first a perception module 1 of the robot processes sensor information. On the basis of the sensed information the system state is classified. This classified system state is then used to determine by use of a control policy 2 an action that is considered suitable for the current state. As mentioned above for the classified state the control policy maps a suitable action which is then executed by the robot. The actions that can be selected are stored in an action library 6. According to state of the art systems the set of actions that is stored in the action library 6 is limited to actions that are all defined by a human designer and that are executed only sequentially. Contrary to the prior art with the present invention it is possible to extend the number of actions that is stored in the library and that may be selected for execution and these new actions are a combination of at least two original actions. Thus, when finally a new action (combined action) is selected to be executed, this results in parallel execution of two original actions, defined in one combined action.

Once an action is selected it is interpreted by an action executor 3 that handles the coordination of the robot's actuators 4 according to a selected action. Since any action is somehow an interaction with the environment execution of a selected action leads to a new state, because the environment 5 is manipulated. Thus, the loop will be started again since perception of the environment is permanently performed and on the basis of the change in the environment the next action to be executed will be selected.

It is to be noted that it is known in the art to apply optimization techniques such as reinforced learning to find the optimal control policy. The following explanations will be made on the basis of so-called Q-learning algorithms as examples for reinforcement learning algorithms. It is evident that the invention is not particularly limited to one of a plurality of possible algorithms. The general idea of the reinforcement learning algorithms is that instead of defining the control policy reward functions are used. The designer of the system sets these scalar values higher for desired events and lower for non-desired ones. Starting from his knowledge the reinforcement learning automatically finds a control policy that maximizes the overall reward in relevant situations. The concept is to explore the situations and to randomize the action selection to find which action contributes to the highest overall reward. The exploration can be done either on the robot itself or in simulation. This will be explained later again when the particular steps for the optimization of robot operation are explained. The Q-learning algorithm will be used later in order to learn a control policy for the extended set of actions and to evaluate feasibility of combined actions.

Figure 2:
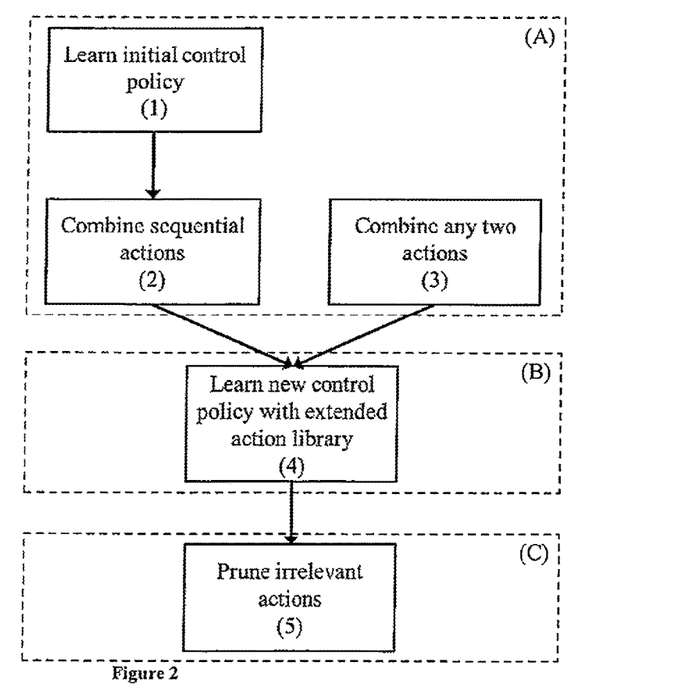
FIG. 2 is a simplified flow chart for illustrating the present invention.

To start with particular aspects of the present invention FIG. 2 is used to illustrate three successive stages of the method according to the invention. In the first stage which is indicated with (A) candidates for combined actions are created. The creation or generation of the combined actions can be performed in two different ways as will be shown later. Further, a selection of only a part or all of the combined actions that are generated is made and the selected combined actions are added to an action library that previously already included all the basic or original actions that form the basis for the generation of the combined actions.

After that and on the basis of the now extended action library a new control policy is learned in stage (B). Learning of the control policy furthermore gives the opportunity to evaluate which combined actions are useful and which not. Those combined actions that turn out not to have any benefit finally are sorted out in stage (C). This means irrelevant actions are pruned from the action library 6 to keep it as compact as possible.

Afterwards there will be given a more detailed explanation of the stages of the method according to the invention.

Before the learning process can be started, combined actions need to be generated or created. In order to do so, there is a plurality of options. Two of them shall be explained hereinafter in detail. As it is shown in FIG. 2 on the right side it is possible to combine any two actions that are original actions in the action library 6. This would result in a great number of combined actions not all of which are reasonable.

Figure 3:
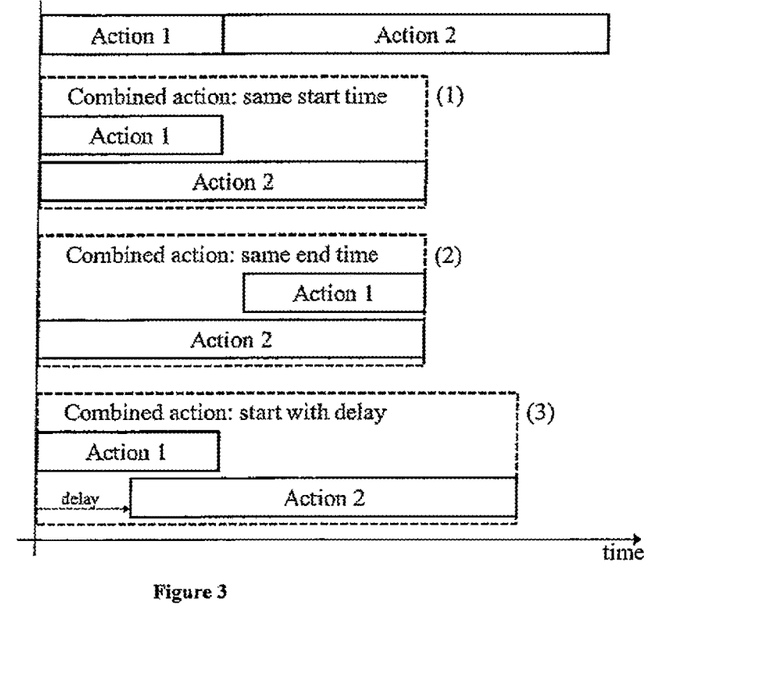
FIG. 3 is an illustration to explain the combination of previously sequential actions to form combined actions.

Combining two original actions means that a new action is generated. Such generation can be done by either subsuming all information from two of the original actions or that it activates two of the original actions with a certain strategy. Examples for combinations of actions are shown in FIG. 3. In the illustration action 1 and action 2 shall be performed. Firstly, there is the possibility that the actions are combined to start at the same time. Secondly the actions are started so that they have the same end time and thirdly the action can be executed with predefined delay between them. This will cause different start times as well as different end times.

As it has been explained with reference to FIG. 1 the action executor 3 is responsible for executing the original actions once they are selected. For the combined actions it is also the executor that is responsible for how such a combination of actions is being executed on the robot. For example the original actions that are combined may affect different modalities. Once for example could control a robot's arm and the other one is to emit an audio signal. Of course both can be simply executed at the same time. On the other side the combined actions may also affect the same modality which means that both actions relate to controlling parts of the robot's arms. Then these actions of course have to be coordinated by the action executor. In general such blending together as it is in detail described in "Adaptive Movement Sequences and Predictive Decisions based on Hierarchical Dynamical Systems" (T. Luksch, M. Gienger, M. Mühlig and T. Yoshiike; in IEEE/RSJ International Conference on Intelligent Robots and Systems, Vilamoura, Algarve, 2012) per se is known.

As mentioned above, it might happen that combined actions are generated which are not useful at all and which do not make any sense. For example if an action "moving end-effected to the left" and a second action "moving end-effected to the right" are to be performed for the same time this simply results in no motion. Of course, such combined action does not make any sense at all. In case that the combined actions are generated by simply taking the original actions from the action library 6 and combining any two of them for all of the available original actions combined actions that are not reasonable or entirely senseless have to be sorted out thereafter in order to avoid unnecessary calculational or costs that would be caused afterwards during further processing. In order to avoid unnecessary combinations to be taken into consideration during further processing it is recommendable to use heuristics that exclude impossible combinations. Such an impossible combination for example are two original actions controlling the same gripper of a robot but in different ways.

A second and more sophisticated approach is that the number of irrelevant combinations of actions is reduced right from beginning. As shown in FIG. 2, stage (A) on the left side it is possible that an initial control policy is learned for the original actions that are stored in the action library. Once such initial control policy for the situation that the robot has to cope with is known it is also known or at least can be learned from evaluating the learning results which of the original actions are executed sequentially in the relevant situations. Then always at least two actions that would be executed sequentially are combined to build one combined action. This reduces the number of combined actions drastically compared to the above mentioned approach where any possible pair or subset is generated. The idea behind this approach is that actions that are temporally close to each other when executed sequentially have a high chance of being useful when performed in parallel.

Like in the other case the combined actions that are created are now added to the action library and thus increase the number of available actions of the action library that now includes the original actions as well as the combined actions.

For simplicity of the present explanations the combined actions have been limited to mention only combinations of two original actions that are combined to form one combined action. Of course the idea of the present invention may also be extended to the combination of more than two actions. Thus, even three or more of the original actions may be combined.

Figure 4:
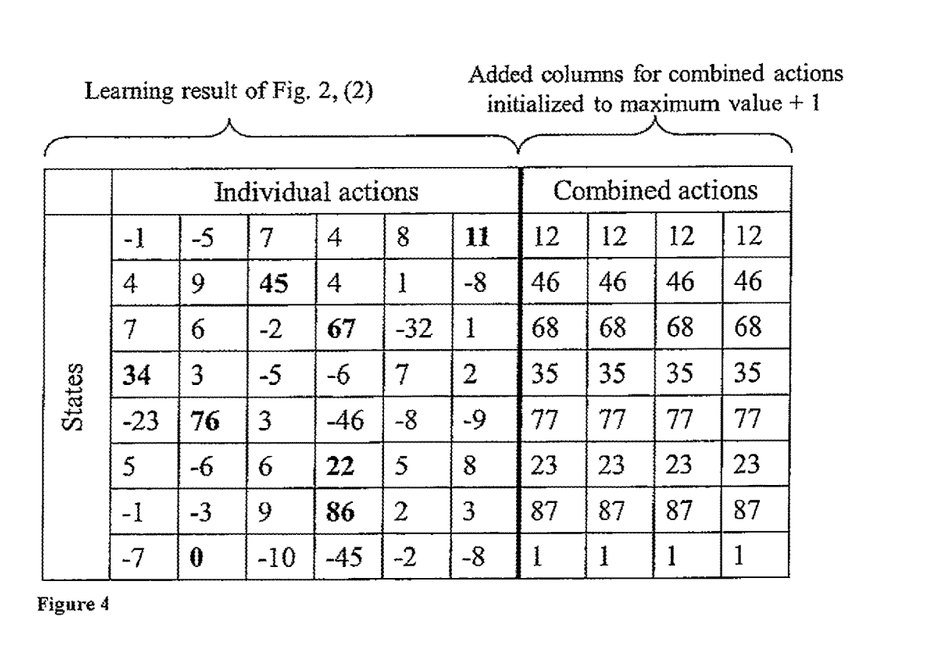
FIG. 4 is an example for a Q-map of a reinforcement learning algorithm which is applied to the original actions and the combined actions that are added to the action library.

In the next stage (B) of the present invention it is necessary to find out which of the new combined actions are feasible. Feasibility is not given alone in case that the combination of actions satisfies the robot's constrains, but it has also to be considered whether the combined action is useful for the relevant situations. This can be evaluated by learning a new control policy on the basis of the action library that is given after the addition of the generated combined actions. The learning itself is performed with a state of the art reinforcement learning technique as already mentioned above. FIG. 4 shows a table that might be an initial table when the learning process is started. The Q-learning algorithm that is used has to consider a few special aspects due to learning the combined actions.

In the present case it is assumed that the original actions already were the basis for a learning process so that the left part of the Q-map that is shown in FIG. 4 that mentions the states as well as the individual (or original) action is the learning result as it was shown in stage A in FIG. 2. Knowledge about such previous learning process will speed up learning of the new control policy including the combined actions significantly.

As shown in the figure the existing policy without the combined actions is used as a starting point. The existing policy is now refined by taking into consideration the combined actions additionally. For each combined action that is added to the action library a column is added to the Q-map. On the basis of the already known control policy for the original actions, rewards for the combined actions are defined. It is to be noted that the reward function has to involve rewards that favor parallel over sequential action execution in order to in fact take the new combined actions into consideration significantly. The rewards could be either a fixed reward for simply choosing a combined action or a reward for faster execution time. This means the robot solves the problem quicker due to doing things in parallel.

The added columns are thus initialized to the maximum value that an action in the respective situation has plus 1. As the Q-learning selects the actions with the highest Q-value during an exploitation step, the algorithm is forced to focus on exploring the new combined actions, which improves the learning speed significantly. The result of the reinforcement learning step is a control policy that uses the previously existing action and—if possible—also some of the combined actions. This means that the policy does not only include information about which actions are feasible at all, but also in which situations they could be used.

It is evident that the knowledge about feasibility of the combined actions may also be used in order to remove irrelevant combined actions from the action library. This is in particular important since in further iterations the whole method may be repeated and a smaller number of then original actions is used for further processing.

Once a policy has been learned including the combined actions a number of these combined actions cannot be used. One reason may be a violation of robot constrains, such as joints limits or collisions, another one is that the combined action does not offer any advantages in a specific scenario. Thus, to keep the action library small for reasons given above, such irrelevant combined actions are removed from the action library. In case of a Q-map this could be achieved by removing all combined actions that have a Q-value smaller than the maximum Q-value for this particular state. At the end of the method as now described there exists a new action library which comprises the original actions plus a number of added combined actions. If the whole method is repeated this new action library is assumed to include the original actions and the combined actions as original actions for the next iteration.

As it has been mentioned earlier, it is in particular advantageous to simulate as many of the method steps as possible in order to be efficient when an action library has to be created.

Coming now again to FIGS. 5 and 6 with the present invention the robot 10 can be operated to simultaneously use his left and right arm 11, 12. While the right arm 11 of the robot pushes the tray 13 aside towards the centre of the working range the left arm 12 simultaneously can pick up the cup 14. Obviously such parallel execution of two actions can significantly increase the efficiency of the robot's work. At the same time the appearance of its behavior is significantly increased because of the more human like behavior.

Another example for an application of the inventive method is a flexible automation by combining actions and creating efficient policy for additional robot work force. In industrial application often various types of robots are used to apply different treatments to materials and products. The robots often carry out very specific tasks repetitively and with a precise timing. However, a recent trend in automation is to add more flexibility to the production process. As it will be explained now with the present invention the flexibility in such automation scenario can be increased.

Figure 7:
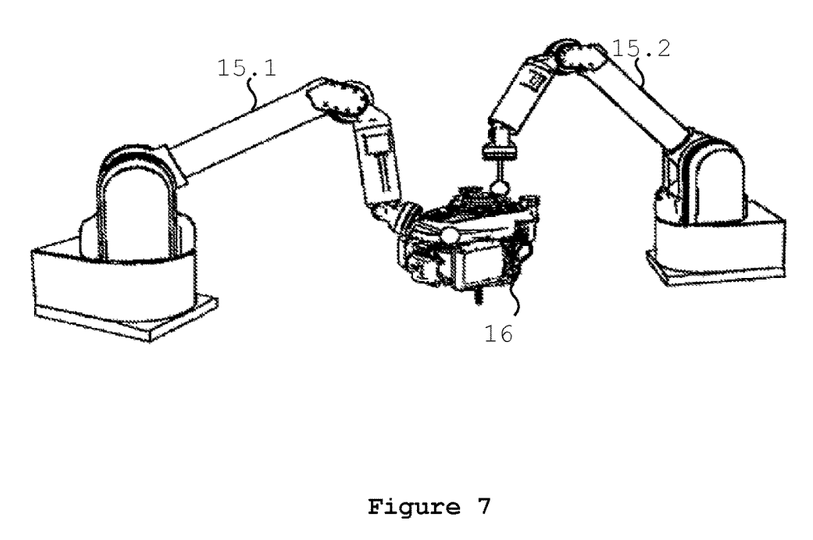
FIG. 7 example of applying the invention to parallelize work of two similar robots.

FIG. 7 shows such scenario. The scenario is a fictive production setting in which the robotic arm is used to sequentially apply different treatments to a product. Examples for such treatments are fixing a cable to a product 16, drilling a hole, fitting something into the hole afterwards and so on. Again, the types of actions and also their sequential execution are defined by a human designer. The designer knows of which actions the robot is capable in order to perform all tasks. The actions that are to be performed are not necessarily dependent on each other, but of course a single robot 15.1 can only perform them sequentially. If now, due to an increased demand, the throughput of the robotic manufacturing process needs to be increased and an additional robot arm 15.2 can be added to the production area. The consequence is the situation shown in FIG. 7 which shows two robot arms 15.1, 15.2 cooperatively working on the same work piece 16. The two robot arms 15.1, 15.2, sharing the same work space, can then be seen as one robotic system that could perform independent actions on the same product 16 in parallel. Any action that the human design defined previously can be performed by either of the two robots 15.1, 15.2. The present inventive method can then be used to evaluate automatically which combinations of such actions are possible with regard to collision avoidance between the robot arms 15.1, 15.2, execution time of actions and dependency between actions. Thus, the combined actions in the sense of the method of the present invention consists of an action that is performed by the first robot arm 15.1 and a second action that is performed by the second robot arm 15.1.

Consequently, the first step in process is to automatically generate candidates of combined actions by adding all combinations of any two individual actions of the action library 6 as it was explained already with respect to FIG. 2. After that the learning algorithm is applied resulting in learning a policy that encodes which of the combined actions can be executed by the two robot arms 15.1, 15.2 in parallel. The candidates of combined actions that are not used in the control policy are then removed from the action library 6 and on the basis of the now resulting action library 6 and the policy resulting from the learning process, the two robots 15.1, 15.2 are operated in parallel.

The invention claimed is:

1. Method for improving operation of at least one robot comprising at least one actuator and an action executor for controlling the at least one actuator according to at least one selected action from a set of predefined actions, the method comprising:
   generating combined actions by combining at least two actions out of a set of original actions stored in an action library, wherein the combined actions combine the at least two actions so that the at least two actions are executed in parallel,
   wherein the generating comprises combining any of the at least two original actions that appear sequentially in a control policy that is a result of a reinforcement learning algorithm applied to the set of original actions of the action library,
   storing the combined actions in the action library in addition to the original actions,
   applying the reinforcement learning algorithm to a set of actions stored in the action library, wherein the set includes the original actions and the combined actions, to learn a control policy making use of the original actions and the combined actions,
   wherein the reinforcement learning algorithm uses a reward function which involves rewards that favor parallel over sequential action execution,
   removing actions that are determined not to be used after the reinforcement learning step from the action library to generate a resulting action library, and
   operating, by the action executor, the at least one actuator of the robot on the basis of the resulting action library and the learned control policy.

2. Method according to claim 1, wherein
the combined actions are combinations of the at least two original actions, and wherein the combination is performed for all possible pairs of the original actions out of all the original actions of the action library.

3. Method according to claim 2, further comprising:
determining which of the combined actions are impossible, and omitting storing the impossible combined actions in the action library.

4. Method according to claim 1, wherein
when the control policy learning for the set of actions including the original actions and the combined actions is performed by applying the reinforcement learning algorithm knowledge about the control policy generated on the basis of the original actions only is used.

5. Method according to claim 1, wherein
using the reward functions for the application of the reinforced learning algorithm that favor combined actions or faster task achievement.

6. Method according to claim 1, wherein
at least the steps of generating the combined actions, storing the combined actions, and applying the reinforcement learning algorithm are performed as a simulation.

7. Method according to claim 1, wherein
at least the steps of generating the combined actions, storing the combined actions, and applying the reinforcement learning algorithm are performed multiple times, wherein in each iteration all actions of the resulting action library form the original actions for a next iteration.

* * * * *